(12) United States Patent
Bickerstaff et al.

(10) Patent No.: US 8,902,295 B2
(45) Date of Patent: Dec. 2, 2014

(54) 3D CAMERA AND IMAGING METHOD

(75) Inventors: Ian Bickerstaff, London (GB); Simon Benson, London (GB); Nigel Kershaw, London (GB); Ian Michael Hocking, London (GB)

(73) Assignee: Sony Computer Entertainment Europe Limited (GB)

( * ) Notice: Subject to any disclaimer, the term of this patent is extended or adjusted under 35 U.S.C. 154(b) by 423 days.

(21) Appl. No.: 13/110,414

(22) Filed: May 18, 2011

(65) Prior Publication Data

US 2011/0285826 A1    Nov. 24, 2011

(30) Foreign Application Priority Data

May 20, 2010    (EP) .................................... 10163450

(51) Int. Cl.
*H04N 13/02*    (2006.01)
(52) U.S. Cl.
CPC ....... *H04N 13/0239* (2013.01); *H04N 13/0246* (2013.01)
USPC .................................... 348/47; 348/E13.074
(58) Field of Classification Search
None
See application file for complete search history.

(56) References Cited

U.S. PATENT DOCUMENTS

| 6,864,910 | B1 |   | 3/2005 | Ogino et al. |   |
|---|---|---|---|---|---|
| 2005/0244050 | A1 | * | 11/2005 | Nomura et al. | 382/154 |
| 2008/0239064 | A1 | * | 10/2008 | Iwasaki | 348/47 |
| 2009/0060273 | A1 | * | 3/2009 | Stephan et al. | 382/103 |

FOREIGN PATENT DOCUMENTS

EP    2042920 A1    4/2009

OTHER PUBLICATIONS

European Search Report, EP 10163450 dated Oct. 20, 2010.
Ser-Nam Lim et al: "Uncalibrated stereo rectification for automatic 3d surveillance" Image Processing, 2004. ICIP '04. 2004 International Conference on Singapore Oct. 24-27, 2004, Piscataway, NJ, USA,IEEE Lnkd-D01:10.1109/ICIP.2004.1419753, vol. 2, Oct. 24, 2004, pp. 1357-1360, XP010785455.
Wikipedia,the free encyclopedia: "Image Rectification" Wikipedia May 3, 2010, XP002604403 Retrieved from the Internet: URL:http://en.wikipedia.org/w/index.php?title=Image_rectification&oldid= 359809333 [retrieved on Oct. 8, 2010].
"stereopsis" In: Forsyth D A Ponce J: "Computer Vision a Modern Approach , Passage" Jan. 1, 2003, Pearson, Upper Saddle River, NJ, USA, XP002604404 ISBN: 0-13-191193-7 , pp. 234-250.

* cited by examiner

*Primary Examiner* — Dave Czekaj
*Assistant Examiner* — Nam Pham
(74) *Attorney, Agent, or Firm* — Lerner, David, Littenberg, Krumholz & Mentlik, LLP

(57) ABSTRACT

A 3D camera comprises first and second laterally displaced optical imaging systems each comprising one or more lenses. The optical imaging systems also each comprise one or more actuators arranged to move one or more lenses of the respective optical imaging system, and a digital image analyzer configured to evaluate the respective field of view of first and second images of a stereoscopic image pair obtained respectively from the first and second optical imaging systems and to generate a disparity value based on a disparity between the respective fields of view. The 3D camera is arranged in operation to adjust the field of view of one or more images generated by the first and second optical imaging systems responsive to the disparity value so as to reduce the disparity between the respective fields of view of stereoscopic image pairs obtained from the first and second optical imaging systems.

14 Claims, 4 Drawing Sheets

US 8,902,295 B2

3D CAMERA AND IMAGING METHOD

CROSS REFERENCE TO RELATED APPLICATIONS

The present application claims the benefit of and priority to EP Application No. 10163450.9, filed May 20, 2010, the entire disclosure of which is incorporated by reference herein.

BACKGROUND OF THE INVENTION

1. Field of the Invention

The present invention relates to a 3D camera and imaging method.

2. Description of the Prior Art

The anticipated uptake of 3D televisions in the home can be expected to create a market in 3D cameras for domestic use (e.g. still and video cameras and camcorders), in much the same way that HD televisions have created a market for HD cameras.

Broadcast and cinema quality 3D camera systems are very expensive, and rely on sophisticated (and heavy) optics to achieve their 3D effects; consequently this technology is not easily scalable down to the domestic camera market.

Therefore it is desirable to develop a 3D camera that provides normal camera functions, such as a zoom function, whilst being economically and practically feasible.

The present invention seeks to address or mitigate the above problem.

SUMMARY OF THE INVENTION

In a first aspect of the present invention, a 3D camera comprises first and second laterally displaced optical imaging systems each comprising one or more lenses, the first and second optical imaging systems also each comprising one or more actuators arranged to move one or more lenses of the respective optical imaging system, and a digital image analyser arranged in operation to evaluate the respective field of view of a first and second image of a stereoscopic image pair obtained respectively from the first and second optical imaging systems and generate a disparity value based on a disparity between the respective fields of view, wherein the 3D camera is arranged in operation to adjust the field of view of one or more images generated by the first and second optical imaging systems responsive to the disparity value so as to reduce the disparity between the respective fields of view of stereoscopic image pairs obtained from the first and second optical imaging systems.

In another aspect of the present invention, an imaging method is provided for a 3D camera comprising laterally displaced first and second optical imaging systems each comprising one or more lenses, the first and second optical imaging systems also each comprising one or more actuators arranged to move one or more lenses of the respective optical imaging system, the method comprising the steps of detecting the respective field of view of a first and second image of a stereoscopic image pair obtained respectively from the first and second optical imaging systems, generating a disparity value based on a disparity between the respective fields of view, and adjusting the field of view of one or more images generated by the first and second optical imaging systems responsive to the disparity value so as to reduce the disparity between the respective fields of view of stereoscopic image pairs obtained from the first and second optical imaging systems.

Further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

A 3D camera and an imaging method are disclosed. In the following description, a number of specific details are presented in order to provide a thorough understanding of the to embodiments of the present invention. It will be apparent, however, to a person skilled in the art that these specific details need not be employed to practise the present invention. Conversely, specific details known to the person skilled in the art are omitted for the purposes of clarity where appropriate.

Figure 3:
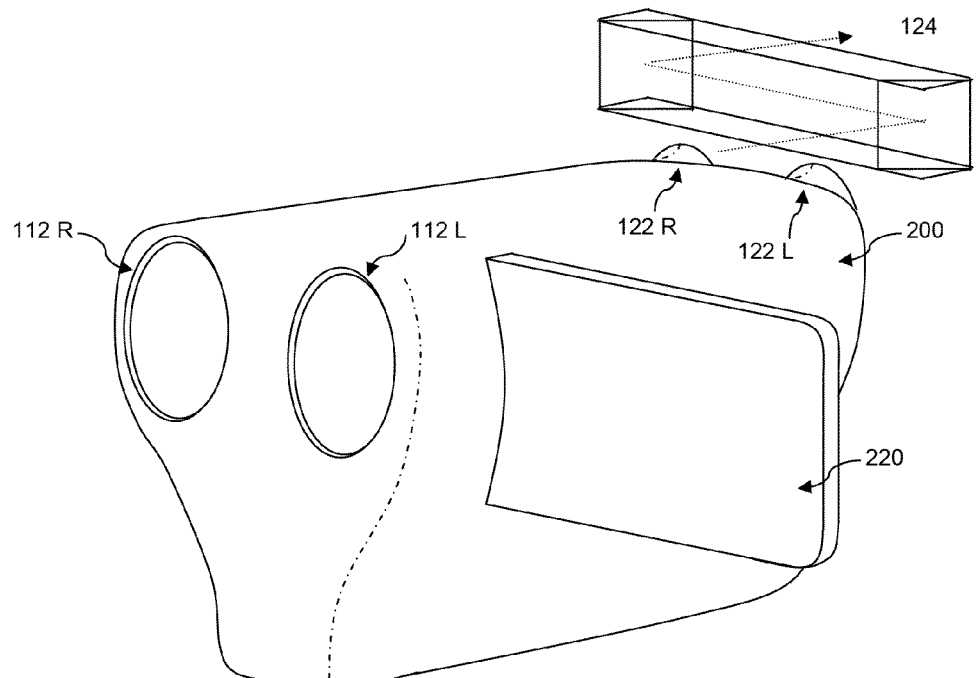
FIG. 3 is a schematic diagram of a 3D camera in accordance with another embodiment of the present invention.

In an example embodiment of the present invention, the optical imaging systems of two conventional cameras (e.g. conventional camcorders) are housed in a common housing of a 3D camera system (see for example FIG. 3). The left and right-mounted optical imaging systems each separately comprise respective lens assemblies (collectively referred to as a lens), an image sensor, and focus and zoom actuators.

The respective left and right images captured by the left and right image sensors are then recorded as a stereoscopic pair of images for reproduction by a 3D display, such as a lenticular screen 3D TV. Generally, a stereoscopic pair of images are recorded at substantially the same time, or exactly the same time, by a respective pair of imaging systems. In the case of a 3D video camera, the images of each pair are preferably recorded at exactly the same time (which, in the context of a video camera, means at least during the same frame or field period), and successive ones of such pairs are recorded, one for each frame or field period.

Notably, the 3D effect produced by images from such a 3D camera system is highly dependent upon a consistent effective positioning of the two lenses, both laterally (which is achieved by their common mounting within the camera) and axially. Axial positioning is controlled by actuators such as the zoom actuator in each optical imaging system (it will be appreciated that zoom and other optical changes can also be achieved with transverse actuation and suitable optics).

However, in conventional optical imaging systems, whilst the zoom actuator is good, it is not accurate enough or sufficiently calibrated between successive optical imaging systems to ensure that the effective position of both left and right variable zoom lenses remains identical. As a result, unpleasant distortions of the 3D effect become likely when such conventional optical imaging systems are paired together.

The 3D camera therefore analyses features of the left and right images to detect their respective fields of view. If the fields of view are different, then one of the captured images is re-sampled to cause the images to have substantially the same filed of view, thereby correcting or alleviating an inequality in the degree of zoom of the two optical imaging systems. The first image and the re-sampled second image then form a stereoscopic pair to be recorded.

Figure 1:
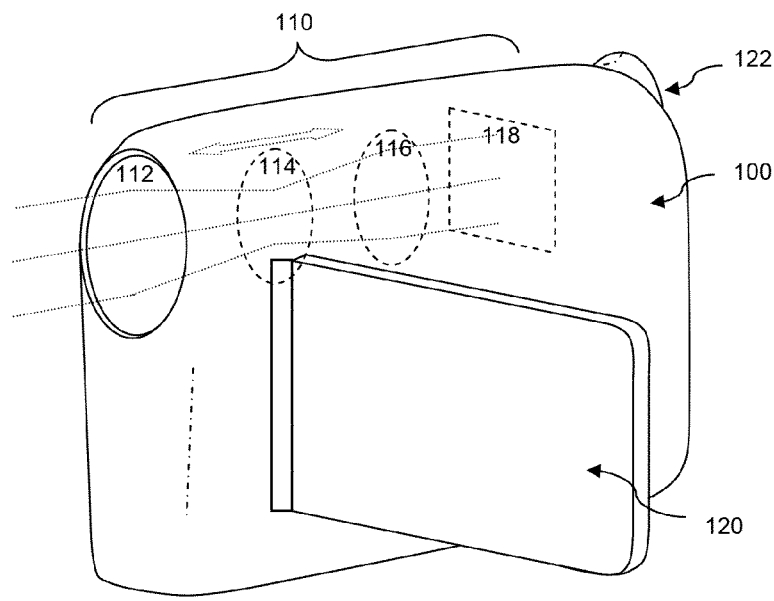
FIG. 1 is a schematic diagram of a monoscopic camera known in the art.

Referring now to FIG. 1, a conventional video camera 100 comprises a number of standard features, including a viewfinder 122, a monitor screen 120 and of course a lens. The lens 112 visible at the front of the camera is the outermost part of an optical imaging system 110 comprising a lens assembly (represented as a non-limiting example by three schematic lenses 112, 114, 116 in FIG. 1) together with actuators (not shown) to control movable focus and zoom components of the lens assembly. In particular, lenses or lens groups (for example, so-called variator and compensator groups) such as the middle lens 114 in the optical imaging system that are moved in accordance with the level of zoom or focus are typically mounted in a carriage or frame which has rollers or some similar means to move with respect to the rest of the optical imaging system. The carriage or frame is in turn moved by an actuator, for example by use of a worm screw or by translating rotational motor movement into axial motion by use of cam slots and grooves. Other axial or transverse arrangements will be apparent to the skilled person. The image sensor itself (shown schematically as a square panel 118 in FIG. 1) is typically a charge coupled device (CCD). Such optical imaging systems are well known in the art and for simplicity are not described in further detail herein. Such a camera may output images to a recording means (e.g. a tape, flash memory, optical drive or hard drive) that may be integral to the camera or remotely connected.

Embodiments of the present invention are based on the assumption that economically viable 3D cameras for domestic use will at least initially comprise two largely conventional optical imaging systems such as those used in video cameras like that of FIG. 1.

Figure 2:
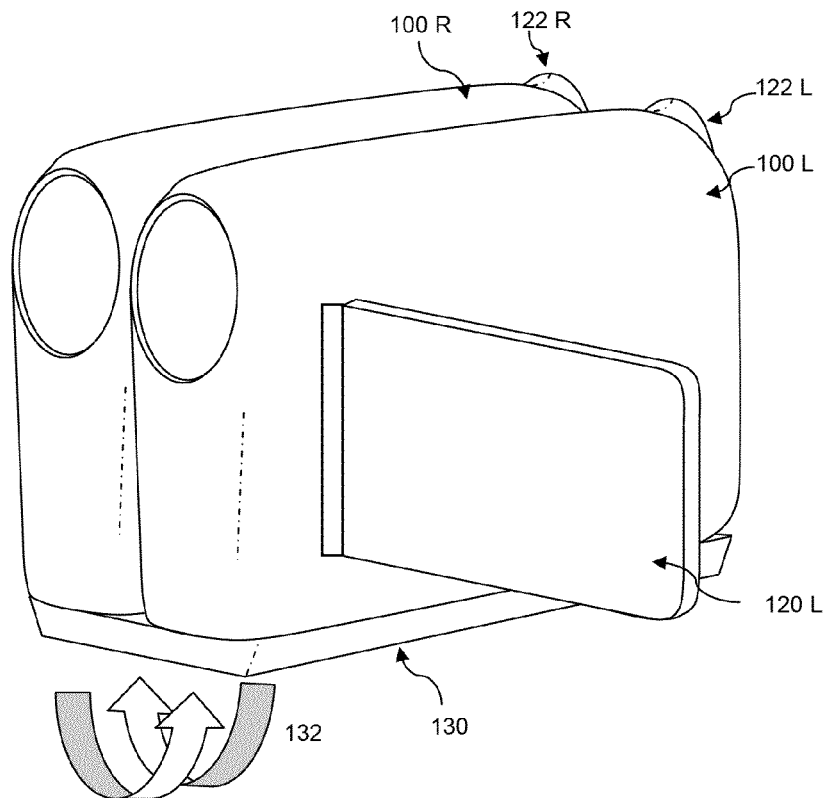
FIG. 2 is a schematic diagram of a 3D camera in accordance with an embodiment of the present invention.

Referring to FIG. 2, a 3D camera may thus take the form of a camera 100L capable of co-operating with a similar model of itself 100R, for example via a shoe 130 that holds the cameras in fixed relation to each other and provides a data bridge between them (represented schematically by arrows 132), to form a stereoscopic camera system. Such a shoe may more generally be a retaining means holding the cameras by any suitable anchor point on any part of the cameras. In this case, the cameras 100L and 100R are identical, which means that when the two are mounted to the shoe 130 the monitor screen of one camera is prevented from opening by the other camera. Therefore, the camera whose monitor screen 120L can be opened is selected as the master camera, and issues commands such as zoom commands to the other, slave camera.

In an embodiment of the present invention, each camera records its own images, with a synchronising timestamp shared between the recordings using the data bridge.

In another embodiment of the present invention, either the master or slave camera can be selected to record both two captured images using a suitable recording format. For example, the slave camera may do the recording whilst the master camera displays its own captured image, so that the battery life of the combined system is extended over what would be possible if the master camera alone did recording and displaying. Alternatively or in addition, power from the slave camera can be supplied to the master camera to perform these functions.

Referring to FIG. 3, in another instance a 3D camera 200 may take a form where the conventional optical imaging systems of two cameras (represented in FIG. 3 by the outermost lens 112L, 112R of the respective optical imaging systems) now share a common body with a common control system, recording system and monitor screen 220 (though respective viewfinders 122L, 122R may still be provided).

Notably in the embodiments of FIGS. 2 and 3 the viewfinders 122L, 122R may not be separated by a distance equal to average human eye separation. Consequently an adaptor 124 may be provided to attach to the 3D camera that comprises at least one periscope arrangement to displace the image from at least one viewfinder laterally, so enabling the user to comfortably look at both viewfinders. Optionally a periscope arrangement may be used for each viewfinder.

Figure 4:
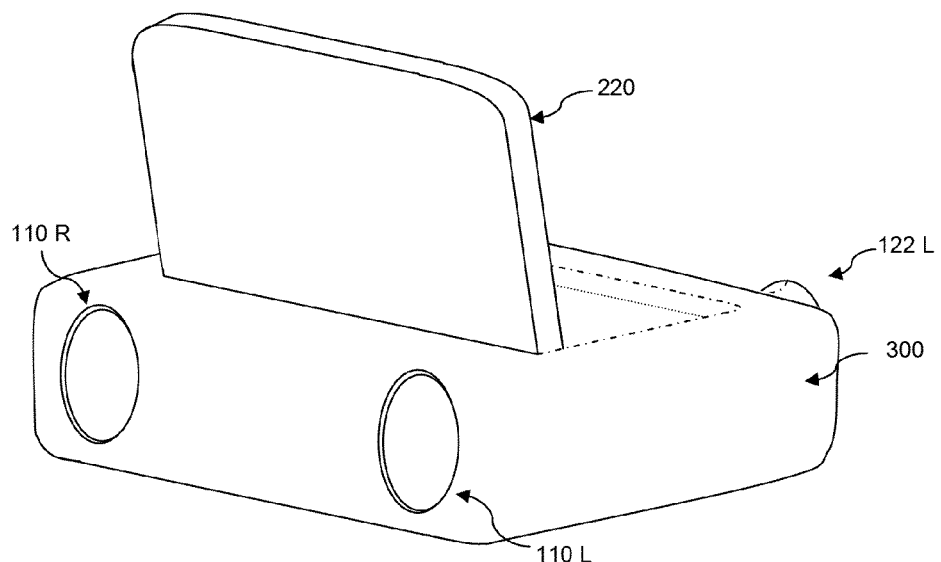
FIG. 4 is a schematic diagram of a 3D camera in accordance with another embodiment of the present invention.

Finally, referring to FIG. 4, in another instance a 3D camera 300 can adopt a binocular-style form factor, with the conventional optical imaging systems separated for example by a distance equal to average human eye separation, but again sharing control, recording and display systems. In this example, the monitor 220 is a 3D monitor screen having a lenticular lens, so providing native 3D display. Again respective viewfinders 122L, 122R may optionally be provided, and can be separated by a distance similar to human eye separation, even if the optical imaging systems use a different separation.

It will be appreciated that both for conventional cameras, and for cameras that can cooperate together or are merged to form 3D cameras as in FIGS. 1 to 4, their zoom function is dependent upon the accuracy and/or physical resolution with which one or more lenses within each lens assembly are moved.

This accuracy and physical resolution will be the product of many contributing factors, including friction in the mechanism, voltage variations to the actuator(s), variability in armature windings and permanent magnet strength within the actuator(s), variability in control loops and sensor circuitry that determine when the zoom has reached an intended level, variability in the dimensions of the components themselves and variability in positioning during assembly of the lenses, the actuator and its components, any linkages or mechanical couplings between these, as well as mechanical or electrical hysteresis, tolerances in the lens manufacture itself and the relative positioning of the lenses and the imaging sensor. Other possible sources of variability within normal manufacturing tolerances will be apparent to the skilled person.

However, whilst current optical imaging systems for domestic cameras (e.g. camcorders) are good, the cumulative variability between any two optical imaging systems can result in two optical imaging systems producing a slightly different degree of zoom (and hence different fields of view) for the same nominally intended degree of zoom. Thus two ostensibly identical optical imaging systems, produced within predetermined manufacturing tolerances, may nevertheless have a slightly different zoom response in practice.

This means that in a 3D camera using a pair of such optical imaging systems, the field of view can be slightly different for the left and right images.

In the resulting 3D image, the subjective effect on a person viewing a stereoscopic video in which the left and right image sources have different zoom responses is to feel as if their eyes move forward or backward relative to each another in the person's head; clearly an unpleasant sensation and one likely to cause eye strain and headaches as the user's eyes and brain try to compensate. This effect may be exacerbated where the difference in field of view between the two optical imaging systems further varies in dependence on the actual zoom level.

Therefore in an embodiment of the present invention, the 3D camera (i.e. a cooperating pair of cameras or a dedicated 3D camera) analyses the left and right images to detect whether there is a disparity in field of view between them.

It will be appreciated that a zoom lens is a lens with an adjustable focal length; that is, the distance between the lens and the focal plane (the image sensor) can be varied, thereby changing the subtended angle of the visible field of view. For a simple zoom mechanism, the field of view a of the optical imaging system is characterised by $$\alpha = 2\arctan\frac{d}{2f} \qquad (1)$$

where d is the relevant dimension of the image sensor (horizontal, vertical and diagonal for to respective horizontal, vertical and diagonal fields of view) and f is the current focal length. It can be see that for a fixed sensor dimension d, increasing the focal length (increasing the zoom) results in a smaller field of view α. This means that an object within the remaining field of view now occupies a larger proportion of the image sensor and so appears to be magnified, or increased in scale. Conversely reducing the focal length increases the field of view α and so objects appear reduced in scale. The resulting change in scale can also vary depending on the physical distance of the object from the optical imaging system.

Figure 5A:
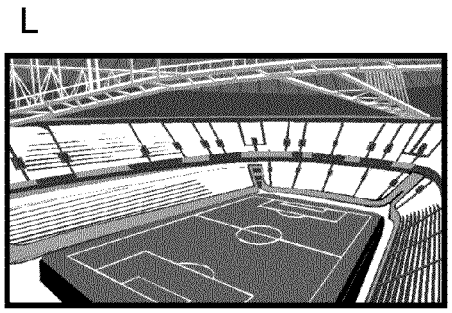
FIGS. 5A and 5B are schematic diagrams illustrating an imaging method in accordance with an embodiment of the present invention.
Figure 5B:
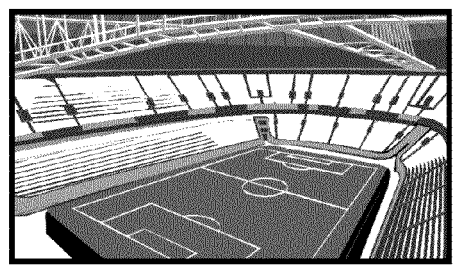

Referring now to FIGS. 5A to 7B inclusive, an analysis technique is described. FIGS. 5A and 5B show the left and right images from respective optical imaging systems at a minimum degree of zoom available to those optical imaging systems, giving a maximum wide-angle view of a football stadium. In this case, there is no disparity between the fields of view in the left and right images.

Figure 6A:
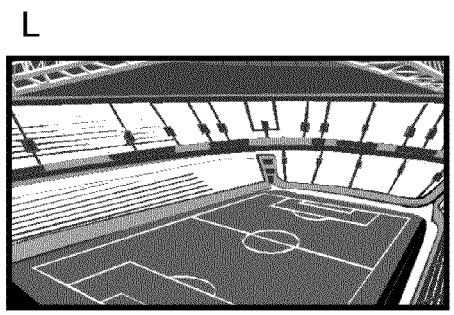
FIGS. 6A and 6B are schematic diagrams illustrating an imaging method in accordance with an embodiment of the present invention.
Figure 6B:

FIGS. 6A and 6B show the left and right images from the respective optical imaging systems at a greater degree of zoom, giving an intended smaller field of view of the football stadium. However in this case, the field of view of the left-hand image (FIG. 6A) is slightly smaller than the field of view in the right-hand image (FIG. 6B), due to differences in the zooming performance of the respective left and right optical imaging systems.

It will be appreciated that in order to analyse the images to estimate differences in field of view, it is useful to distinguish differences between the images that are due to stereoscopic effects (having different viewpoints) as opposed to differences due to zoom disparity; in other words, to distinguish differences in positional offset from differences in scale.

Firstly, it will be understood that stereoscopic offset is a function of distance to the subject matter and lens separation; for many cases where a significant degree of zoom is needed, therefore, the distances involved will mean that stereoscopic separation of the subject matter within the resulting zoomed images will be small, and may, to a first approximation, be ignored (i.e. not be detected or accounted for). This is the case in present illustrations 5A to 7B, where (for the sake of clarity in the examples) stereoscopic offset is negligible.

However, to detect and account for stereoscopic offset, optionally a region at the centre of the left and right images may be spatially correlated to detect any offset. For example, one image may be shifted horizontally with respect to the other to find the offset to giving the closest image match for the central third of the image (e.g. the region corresponding in the central square if the image were divided into a 3×3 grid). Of course, other regions or proportions of the images may be used in a similar manner.

Such a detected offset may then be maintained during a subsequent analysis of relative scale between the images to account for the stereoscopic effect.

As noted above, stereoscopic offset is a function of the distance between the 3D camera and the objects in the scene. Consequently in a typical scene there may be multiple offsets between the left and right images due to foreground objects, for example. Therefore in an embodiment of the present invention, spatial correlation between both entire images is conducted, and the largest correlation is chosen as indicative of the stereoscopic offset. Optionally the chosen correlation is the largest below a threshold offset level, with the threshold offset level being derived empirically to exclude stereoscopic offsets from objects within a certain range of the camera. Alternatively the correlation chosen may correspond to that area of an image currently in focus.

In FIGS. 6A and 6B, the difference in the fields of view (i.e. the disparity in zoom levels) results in the periphery of the right-hand image (FIG. 6B) showing features not present in the left hand image (FIG. 6A), both horizontally 410 and vertically 420. Analysis of these feature disparities provides a means by which the 3D camera can determine the difference in field of view between the two optical imaging means.

The analysis to detect feature disparities at the left and right edges of the two images (i.e. horizontal disparity) should preferably account for stereoscopic offset effects as discussed previously. By contrast, comparisons of features at the upper and lower edges of the two images (i.e. vertical disparity) will generally not be subject to 3D offset effects (unless the camera is held substantially off-vertical, which is unlikely for a 3D video camera and can be detected by a known orientation sensor in the case of a 3D still camera) and hence are a more robust indicator of relative scale.

In either case (vertical or horizontal), a comparison of features at the edges of the images can be used to indicate the amount by which the field of view differs between the images (i.e. a disparity value). Thus the feature 420 circled in the bottom left corner of FIG. 6B is (for example) vertically displaced from the corresponding feature in FIG. 6A by 3% of the vertical extent of the image. Similarly, the feature 410 circled at the right of FIG. 6B is (again for example) horizontally displaced from the corresponding feature of FIG. 6A by 3% of the horizontal extent of the image. Consequently the 3D camera can estimate the to disparity in the respective fields of view. Such a disparity value can be expressed as a percentage difference in extent of view in the image (i.e. 3%) based upon the disparity in fields of view, or similarly a ratio between left and right images, or in terms of a number of pixels, or can be expressed in terms of angular field of view itself (for example by multiplying d by 1 and 1/1.03 for the respective optical imaging systems in equation 1).

Alternatively or in addition, vertical and/or horizontal disparity can be similarly compared anywhere within the pair of captured images by detecting an image feature (for example a distinct colour region) and comparing its relative horizontal and/or vertical extent between the left and right images. However it will be appreciated that the accuracy of such a comparison is limited by the number of pixels that the image feature occupies; hence use of substantially the whole image as a basis of comparison provides a more sensitive measure of relative field of view.

It will be appreciated that such image analysis will be conducted either by a processing unit (150, FIG. 8) of the camera (or one of the cameras in a cooperating pair) such as a central processing unit or a dedicated image analysis processor.

Figure 7A:
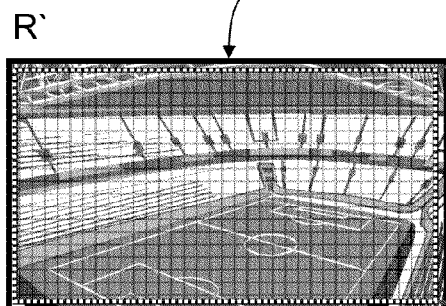
FIGS. 7A and 7B are schematic diagrams illustrating an imaging method in accordance with an embodiment of the present invention.

Referring now also to FIG. 7A, as described above a comparison of the horizontal and vertical extent of the left and right images in the example shows that the right hand image (FIG. 6B) extends beyond the left hand image (FIG. 6A) by 3%. In other words, it has the smaller overall scale or degree of zoom.

Figure 7B:
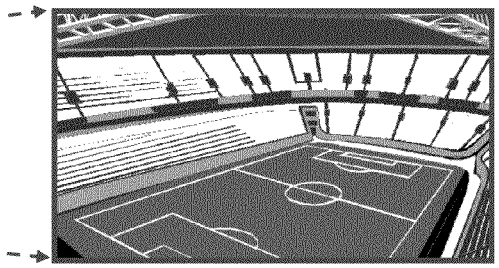

In an embodiment of the present invention, a version of the right hand image R' is then cropped (as shown in FIG. 7A) to a subsection having the same field of view as the left hand image (FIG. 6A) and hence the same effective degree of zoom—but not the same image resolution. Consequently, as shown in FIG. 7B it is then upscaled or upsampled (R") to the same resolution as the left hand image of FIG. 6A, thereby removing or at least reducing the disparity in field of view between images having corresponding resolutions.

Figure 8:
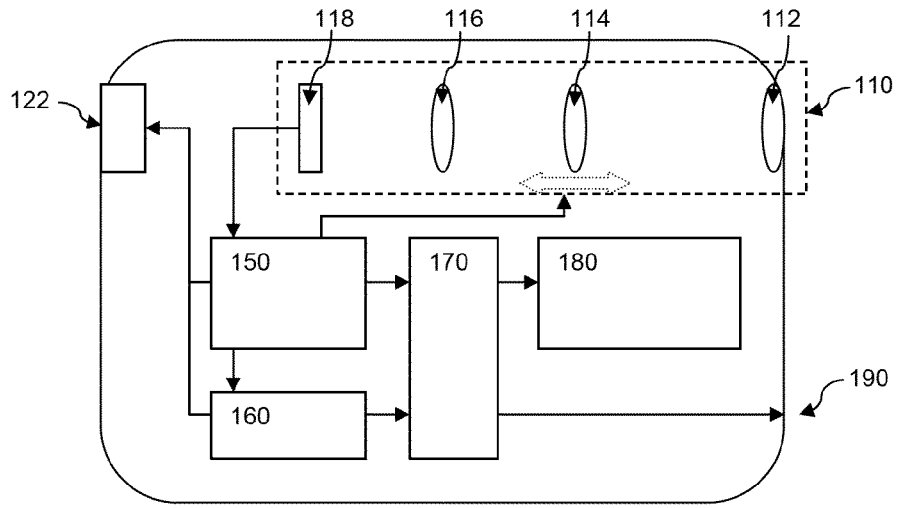
FIG. 8 is a schematic diagram of a 3D camera in accordance with an embodiment of the present invention.

Again, such digital image processing may be performed by a CPU (150, FIG. 8) or by a dedicated graphics processor (160, FIG. 8).

Alternatively or in addition to a technique for upscaling a cropped version of whichever of the two images has the lower zoom level (the widest field of view), a different technique is possible, if the 3D camera is suitably equipped as follows.

Many conventional cameras have a CCD with a resolution greater than that of the final recorded image resolution (i.e. not all pixels of the captured image are selected for the final image). The candidate final image is thus a subregion of the captured raw image. The purpose of this technique in conventional cameras is to provide digital image stabilisation, by moving the selected subregion position within the captured raw image in response to detected camera shake, thereby eliminating the shake in the final recorded image.

It will be appreciated however that therefore in the presently described 3D camera system, the existence of a border of unselected image data surrounding a candidate final image allows for the selected region on one image to be expanded to match the field of view of the other image, and then the region can be downsampled to the appropriate final resolution.

Thus to use the example in FIGS. 6A and 6B, instead of cropping and upscaling the right hand image of FIG. 6B (meaning that there is less image information in the final right-hand image and so a potential loss of image quality), alternatively the left hand image of FIG. 6A may be re-selected as a larger region (i.e. in this example 3% larger, and encompassing the original image), and then downscaled to the correct resolution, meaning that the final result is likely to have a better image quality (compared to upscaling) as it is based on more image information.

Thus more generally one of the images is resampled from the raw image (or a copy thereof) to match the scale of the other. In one case, resampling takes the form of upscaling a region within one candidate image, and in another case, resampling takes the form of downscaling a region that extends beyond the candidate image.

Then again, it may be that re-sampling of one image affects some other perceivable quality, such as image sharpness, or introduces changes to the image that increase the resulting bit rate during video encoding. Thus alternatively or in addition, both left and right images may be respectively re-sampled (e.g. respectively up- and down-sampled) to generate images at a new scale between the scales of the original left and right images. This may then facilitate jointly applied post-processing functions to adjust the stereoscopic image pair (for example a common sharpening algorithm), and result in greater continuity between successive frames of image pairs during encoding.

If it is significant to the other quality factor that the same process is used (i.e. upscaling or down-scaling) then both images may be subjected to the same process, but with respective re-scaling applied responsive to the detected disparity in fields of view so as to reduce the disparity.

In any case, the left and right final images, comprising at least one re-sampled image between them, can then be encoded and output or recorded as a stereoscopic image pair.

Alternatively or in addition, in an embodiment of the present invention the above evaluation of a difference in the respective field of view of each of the optical imaging systems can be used to control adjustment of one or more actuators within one or both of the optical imaging systems so as to reduce the disparity in field of view.

Referring again to FIGS. 6A and 6B, in this example the left-hand image (FIG. 6A) has a narrower field of view than the right-hand image (FIG. 6B). Therefore either the actuator of the left-hand optical imaging system can be controlled to widen its field of view (in the example, to account for a 3% difference in extent between the images), or the actuator of the right-hand optical imaging system can be controlled to narrow its field of view (again, in the example in response to a 3% difference in extent).

Which optical imaging system should make the adjustments can be determined by the preceding zoom control. Thus if the 3D camera was controlled by the user to zoom out (widening the field of view) then in this example it is more consistent with the user's wish to widen the field of view of the left-hand optical imaging system. Conversely if the user zoomed in (narrowing the field of view) then it is more consistent to narrow the field of view of the right-hand optical imaging system. Alternatively both optical imaging systems could be adjusted toward each other, which may result in a faster match of fields of view.

The adjustment process can use a feedback loop to make further adjustments to one or both optical imaging systems until the disparity in field of view between the optical imaging systems falls below a threshold level.

When the above adjustments to actuators are used in conjunction with the digital rescaling techniques described previously herein, the rescaling can be used to provide an immediate reduction in field of view disparity between left and right images (possibly at a cost of degrading image quality in one or both images), whilst the control of the actuators can be used to reduce the actual disparity over one or more successive video frames, after which digital resealing is no longer required until a new disparity is detected.

It will be appreciated that the above embodiments therefore advantageously facilitate an affordable 3D camera that generates a stereoscopic image in which left and right fields of view are substantially the same, irrespective of variances within the manufacturing tolerances of the left and right optical imaging systems.

Moreover, by correcting for such disparities within the 3D camera, in embodiments of the present invention the 3D camera is able to access image data not subsequently recorded in to the stereo image, with which a superior scale correction can be achieved (i.e. downsampling from a raw image extending beyond the candidate recorded image area).

In the case of a paired set of suitable monoscopic cameras, it will be appreciated that potentially therefore the raw image data, or alternatively the extended subsection of the raw image, may need to be passed over the data bridge between the cameras.

Similarly, by adaptively controlling zoom (and potentially other) actuators within one or both optical imaging systems in response to the estimated difference in their fields of view, an affordable 3D camera can produce a well-balanced 3D image at source.

It will be appreciated that the above techniques, applied to stereoscopic image pairs, are applicable to 3D still cameras, 3D video cameras and 3D video camcorders, and the term '3D camera' is intended to encompass these.

Further techniques of particular benefit for video capture include storing data describing the last detected filed of view disparity between left and right images; if there is no adaptive correction of the optical imaging system itself, this may be used for subsequent image pairs while the zoom level remains unchanged (i.e. when the camera has not moved the corresponding actuator(s)). Optionally during this time a periodic re-check or rolling average may be used to capture any slippage or other unintended movement within the lens assembly or optical imaging system. Similarly a re-check may be instigated upon detection of a sudden movement of the camera, for example by using an accelerometer signal that exceeds a threshold value.

Similarly, for both still and video imaging, a disparity profile may be compiled to predict the scale disparity between images for each available level of zoom. The profile may contain mean and variance values for the disparities; where a detected disparity exceeds the variance by a threshold amount, it can be assumed that an error in image analysis has occurred. In this case either the mean value may be used instead, or scale correction can be skipped. In the vase of video, optionally the previous video frame's scale correction can be re-used. The profile may be stored in a memory (not shown) available to a processor (150, FIG. 8).

Referring now to FIG. 8, in a summary embodiment a 3D camera comprises two optical imaging systems 110 (only one illustrated for clarity), each comprising one or more lens assemblies (represented schematically by lenses 112, 114 and 116), at least one of which to (114) is movable by an actuator (not shown), and also comprising an imaging means such as a CCD 118. The output of the CCD goes to a processor 150 such as a CPU or dedicated image analysis processor, which estimates the field of view from both received images and determines whether there is a disparity between them.

If there is not a disparity, then the processor can output the images to a monitor screen (not shown in FIG. 8) or to viewfinders 122, and also to an encoder 160 to encode the images for recording by a recording means 180 or direct output 190.

If there is a disparity (or a disparity exceeding a tolerance threshold) then the processor can instruct a graphics processor 160 to resample one or both images to reduce the disparity, before either returning the image or images to the processor 150 or passing them itself to the viewfinder and encoder as described above. The processor and graphics processor can be the same unit.

Alternatively or in addition, the processor can control one or more actuators (not shown) in one or both optical imaging systems to move by an amount responsive to the disparity and calculated to reduce the disparity in field of view for the next captured pair of images.

Figure 9:
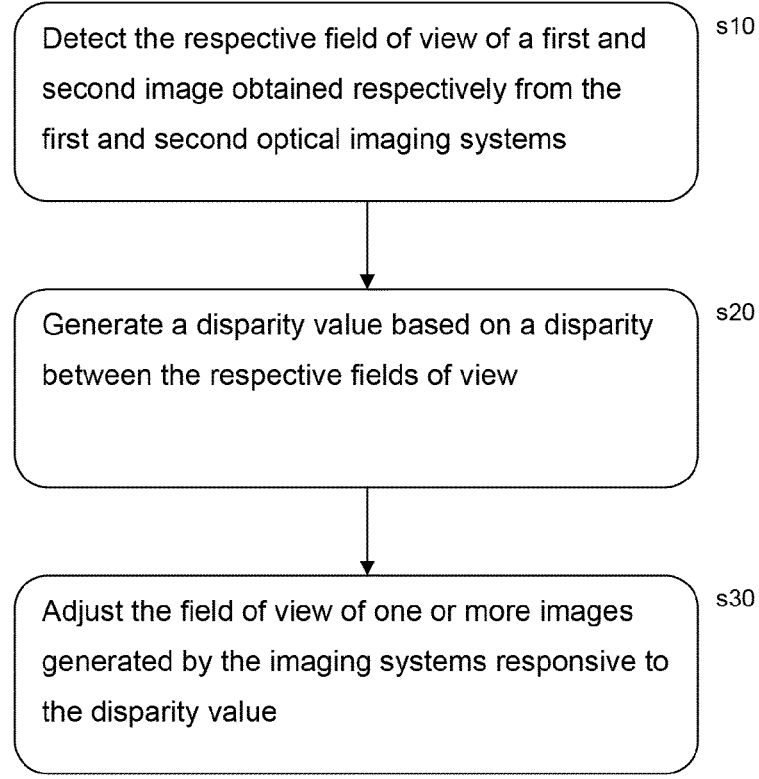
FIG. 9 is a flow diagram of an imaging method in accordance with an embodiment of the present invention.

Referring now to FIG. 9, an imaging method for a 3D camera (i.e. a dedicated 3D camera or suitable monoscopic cameras operating together) as described herein comprises:

in a first step s10, detecting the respective field of view of a first and second image obtained respectively from the first and second optical imaging systems;

in a second step s20, generating a disparity value based on a disparity between the respective fields of view; and in a third step s30, adjusting the field of view of one or more images generated by the first and second optical imaging systems responsive to the disparity value.

It will be apparent to a person skilled in the art that variations in the above method corresponding to operation of the various embodiments of the apparatus as described and claimed herein are considered within the scope of the present invention, including but not limited to:

- re-sampling at least one of the first or second images responsive to the disparity value to substantially equalise (or at least reduce a disparity in) the field of view of the first and second images;
- comparing fields of view between the first and second image based upon one or more selected from the list consisting of the horizontal extent of the images, the horizontal extent of an image feature within the images, the vertical extent of the images, and the vertical extent of an image feature within the images;
- detecting and compensating for a lateral offset between the images due to the lateral displacement between the optical imaging systems;
- where one image has a smaller zoom/scale (i.e. wider field of view) than the other image, up-sampling a subsection of that image corresponding to the area of the image at the same scale as the other image to generate a replacement image having substantially the same scale and resolution as the other image; where one image has a larger zoom/scale (i.e. narrower field of view) than the other image, and the CCD captures image data that extends beyond the current image, then down-sampling CCD image data of a region greater than and encompassing the selected image to generate a replacement image having substantially the same scale and resolution as the other image;
- using the same re-sampling ratio for successive frames of image pairs when there has been no change in zoom (and/or optionally in focussing)
    unless there has been a knock or jolt which may have moved optical components and that registers above a threshold level from an accelerometer;
- storing associations relating relative differences in field of view between left and right images to the expected positions of one or more corresponding pairs of actuators in the first and second optical imaging systems;
- controlling one or more actuators of one or both optical imaging systems responsive to the disparity value to substantially equalise the field of view generated by the first and second optical imaging systems;
- the 3D camera being made using a pair of suitably adapted mono cameras that co-operate via a shoe (i.e. a common physical mount) which provides a data link between the cameras (though a wireless link could also be used, but this is likely to drain power more quickly); and
- the 3D camera is one or more selected from the list consisting of a 3D still camera, a 3D video camera, and 3D camcorder.

Finally, it will be appreciated that the methods disclosed herein may be carried out on hardware suitably adapted as applicable by software instruction or by the inclusion or to substitution of dedicated hardware. For example, by co-operating monoscopic cameras that each have the facility to co-operate with like cameras to implement techniques disclosed herein, or dedicated 3D cameras that process images from both of their optical systems in accordance with techniques disclosed herein.

Thus required adaptations to existing parts of a device may be implemented in the form of a computer program product or similar object of manufacture comprising processor implementable instructions stored on a non transitory data carrier such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the device.

We claim:

1. A 3D camera, comprising:
    first and second laterally displaced optical imaging systems each comprising one or more lenses;
    the first and second optical imaging systems also each comprising one or more actuators arranged to move zoom components of the respective optical imaging systems;
    a digital image analyser arranged in operation to evaluate a respective field of view of a first image and a second image of a stereoscopic image pair obtained respectively from the first and second optical imaging systems and to generate, based on a disparity between the respective fields of view, a zoom disparity value indicating a difference in a degree of zoom between the zoom components of the respective optical imaging systems;
    a digital image processor operatively coupled to the digital image analyzer; wherein:
    the 3D camera is arranged in operation to adjust an extent of a field of view of one or more images generated by the first and second optical imaging systems responsive to the disparity value so as to reduce the zoom disparity between the respective fields of view of stereoscopic image pairs obtained from the first and second optical imaging systems; and
    the digital image processor is arranged in operation to re-sample at least one of the first or second images responsive to the disparity value to substantially equalise the field of view of the first and second images.

2. A 3D camera according to claim 1, in which the first and second optical imaging systems are the same to within predetermined manufacturing tolerances.

3. A 3D camera according to claim 1, in which the digital image analyser is operable to compare the fields of view in the first and second images based upon one or more selected from the list consisting of:
    i. a horizontal extent of the images;
    ii. a horizontal extent of an image feature within the images;
    iii. a vertical extent of the images; and
    iv. a vertical extent of an image feature within the images.

4. A 3D camera according to claim 3, in which the digital image analyser is arranged to detect and compensate for a lateral offset between the first and second images due to the lateral displacement between the optical imaging systems.

5. A 3D camera according to claim 1, in which
    the digital image processor is arranged to select one of the first and second images having the wider field of view; and
    the digital image processor is arranged to up-sample a subsection of the selected image to generate a replacement image having a substantially same field of view and resolution as the other one of the first and second images.

6. A 3D camera according to claim 1, in which the first and second optical imaging systems each capture image data that spatially extends beyond the respective areas of the first and second images; and
    the digital image processor is arranged to select one of the first and second images having the narrower field of view; and
    the digital image processor is arranged to down-sample captured image data of a region greater than the selected image and encompassing the selected image to generate a replacement image having substantially the same field of view and resolution as the other one of the first and second images.

7. A 3D camera according to claim 1 in which an adjustment of the field of view of one or more images generated by the first and second optical imaging systems uses a given disparity value derived during a previous frame of first and second images if the one or more actuators have not been moved in the meantime.

8. A 3D camera according to claim 1, in which the 3D camera is operable to store associated relative differences in field of view between corresponding first and second images with respect to expected positions of one or more corresponding pairs of actuators in the first and second optical imaging systems.

9. A 3D camera according to claim 1 comprising a co-operating pair of monoscopic cameras placed in fixed relation to each other by a common physical mount comprising a data bridge between the cameras.

10. A 3D camera according to claim 1, in which the 3D camera is one or more selected from the list consisting of:
    i. a 3D still camera;
    ii. a 3D video camera; and
    iii. a 3D camcorder.

11. A 3D camera according to claim 1, comprising an actuator controller arranged in operation to control the one or more actuators of at least one of the optical imaging systems responsive to the disparity value to substantially equalise the field of view generated by the first and second optical imaging systems.

12. An imaging method for a 3D camera comprising laterally displaced first and second optical imaging systems each comprising one or more lenses, the first and second optical imaging systems also each comprising one or more actuators arranged to move zoom components of the respective optical imaging systems, the method comprising the steps of:
    detecting a respective field of view of a first image and a second image of a stereoscopic image pair obtained respectively from the first and second optical imaging systems;
    generating, based on a disparity between the respective fields of view, a zoom disparity value indicating a difference in a degree of zoom between the zoom components of the respective optical imaging systems;
    adjusting an extent of a field of view of one or more images generated by the first and second optical imaging systems responsive to the zoom disparity value so as to reduce the disparity between the respective fields of view of stereoscopic image pairs obtained from the first and second optical imaging systems; and re-sampling at least one of the first or second images responsive to the disparity value to substantially equalise the field of view of the first and second images.

13. An imaging method for a 3D camera according to claim 12, wherein:

in which the first and second optical imaging systems each capture image data that spatially extends beyond the respective areas of the first and second images, and in which the step of re-sampling comprises:

selecting one of the first and second images having a narrower field of view; and down-sampling captured image data of a region greater than the selected image and encompassing the selected image to generate a replacement image having substantially the same field of view and resolution as the one image of the first and second images.

14. A tangible, non-transitory computer program product on which computer readable instructions of a computer program are stored, the instructions, when executed by a processor, cause the processor to perform an imaging method for a 3D camera comprising laterally displaced first and second optical imaging systems each comprising one or more lenses, the first and second optical imaging systems also each comprising one or more actuators arranged to move zoom components of the respective optical imaging systems, the method comprising:

detecting a respective field of view of a first image and a second image of a stereoscopic image pair obtained respectively from the first and second optical imaging systems;

generating, based on a disparity between the respective fields of view, a zoom disparity value indicating a difference in a degree of zoom between the zoom components of the respective optical imaging systems;

adjusting an extent of a field of view of one or more images generated by the first and second optical imaging systems responsive to the zoom disparity value so as to reduce the disparity between the respective fields of view of stereoscopic image pairs obtained from the first and second optical imaging systems; and re-sampling at least one of the first or second images responsive to the disparity value to substantially equalise the field of view of the first and second images.

* * * * *